United States Patent [19]
Kiefer et al.

[11] Patent Number: 4,921,711
[45] Date of Patent: May 1, 1990

[54] ANIMAL FEED OR DRINKING WATER CONTAINING PROPANEDIOL FORMATES

[75] Inventors: Hans Kiefer, Wachenheim; Hansjoerg Bipp; Fritz Fink, both of Limburgerhof; Hagen Jaedicke, Ludwigshafen; Dieter M. Poralla, Wachenheim, all of Fed. Rep. of Germany

[73] Assignee: BASF Aktiengesellschaft, Ludwigshafen, Fed. Rep. of Germany

[21] Appl. No.: 930,527

[22] Filed: Nov. 14, 1986

[30] Foreign Application Priority Data

Nov. 16, 1985 [DE] Fed. Rep. of Germany ....... 3540771

[51] Int. Cl.$^5$ .................................................. A23K 3/00
[52] U.S. Cl. ...................................... 426/66; 426/532
[58] Field of Search ................................. 426/532, 66

[56] References Cited

U.S. PATENT DOCUMENTS 2,405,936  8/1946  Bartlett ............................. 560/232
3,982,026  9/1976  Fahnenstich et al. ................. 426/54
4,179,522  12/1979  Huitson .............................. 514/557
4,223,045  9/1980  Fink ............................... 426/532 X

FOREIGN PATENT DOCUMENTS 660160   4/1938  Fed. Rep. of Germany .
2204824  8/1973  Fed. Rep. of Germany .
2449657  4/1975  Fed. Rep. of Germany .
2412834  9/1975  Fed. Rep. of Germany .
2653448  7/1977  Fed. Rep. of Germany .
1483340  8/1977  United Kingdom .

OTHER PUBLICATIONS

Agricultural and Biological Chemistry, vol. 36, No. 13, 1972, pp. 2473-2478.

Primary Examiner—Donald E. Czaja
Assistant Examiner—Celine T. Callahan
Attorney, Agent, or Firm—Keil & Weinkauf

[57] ABSTRACT

An animal feed or drinking water contains a biocidally or biostatically active amount of not less than one formic acid ester of 1,2-propanediol.

7 Claims, No Drawings

ANIMAL FEED OR DRINKING WATER CONTAINING PROPANEDIOL FORMATES

The present invention relates to an animal feed or drinking water which contains a biocidally or biostatically active amount of a formic acid derivative. The present invention also relates to an agent which contains one or more formic acid derivatives and to the use of formic acid derivatives in animal feeds or drinking water.

It has been known for a long time that various organic acids (for example propionic acid and formic acid) and also salts of these acids (for example sodium propionate, calcium formate and ammonium propionate) have a biocidal and/or biostatic action, so that some of these substances have come to be widely used as preservatives for animal feeds to reduce or eliminate microorganisms (fungi and bacterial) therein, since they can have an adverse effect on the quality of the feed and hence on the animal organism, thereby appreciably reducing performance.

Some harmful bacteria are ingested by the animals not so much via the feed as via other sources in the environment (for example as a consequence of coprophagy) or are ubiquitous inhabitants of the digestive tract, like coliform germs, which in certain circumstances can multiply wildly and frequently are responsible for diarrhea. These microorganisms can likewise be controlled with the abovementioned organic acids or salts thereof.

However, use of the pure acids makes for difficult storage and handling, owing to their corrosive and cauterizing action and their pronounced, unpleasant odor. It is true that pulverulent or even liquid salts of these acids do not have these disadvantages of difficult handling; but they are more expensive to apply and, owing to their lower concentration of active ingredient and higher pH, they are less efficient.

It is an object of the present invention to provide an animal feed or drinking water which contains a biocidally or biostatically active amount of a formic acid derivative, in particular to avoid the prior art disadvantages of using free acids and also to inhibit or reverse the growth of harmful microorganisms.

We have found that this object is achieved with an animal feed or drinking water which contains a biocidally or biostatically active amount of not less than one formic acid ester of 1,2-propanediol.

In a preferred embodiment of the invention, the animal feed or drinking water contains one or more of the following formic acid esters:
1,2-propanediol bisformate,
1,2-propanediol 1-formate,
1,2-propanediol 2-formate.

In a further preferred embodiment, the animal feed or drinking water additionally contains 1,2-propanediol.

Particular preference is given to an animal feed or drinking water which contains a mixture of 1,2-propanediol bisformate, 1,2-propanediol 1-formate, 1,2-propanediol 2-formate and 1,2-propanediol.

The present invention also relates to a mixture of the abovementioned constituents for use as an additive in animal feeds or drinking water. The mixture includes one or more formic acid esters of 1,2-propanediol. Particularly preferably the mixture includes the four abovementioned constituents.

It is further preferred that the animal feed or drinking water additionally contains monoglyceryl formate, diglyceryl formate or triglyceryl formate, individually or mixed.

The present invention finally relates to the use of the above mixture in animal feed or drinking water.

Particular preference is given to a mixture according to the invention which is obtainable by carbonylation of 1,2-propanediol.

It was found, surprisingly, that the industrially particularly readily available 1,2-propanediol formates which contain 1,2-propanediol and the formates thereof are particularly highly active against coliform bacteria (*Escherichia coli, Proteus vulgaris* and Serrabia spp.). At the same time, these substances have advantages over known substances having similar stated objectives in that:

They do not corrode iron (standard steel, kettle sheet H 1) and are inert to most plastics.

Animal feeds which are treated with the substances according to the invention can be stored in noncorrosion-proofed containers or rooms.

The substances or mixtures thereof to be used according to the invention have only a very weak odor and are noncauterants. They are easy to meter and process, even at around 0° C., and are miscible with water in any proportion.

They are prepared in line with known methods of esterifying an alcohol with a carboxylic acid, for example by azeotropic removal of the water of reaction. Advantageously, 1,2-propanediol is reacted with carbon monoxide under superatmospheric pressure.

The agent according to the invention can also contain the monoester, diester or triester of formic acid with glycerol. The mono- and diesters can in each case be present as the two positional isomers (1- or 2-monoester and 1,2- or 1,3-diester). Preferably the agent contains mixtures of the glycerol esters mentioned.

The substances and mixtures of 1,2-propanediol and the formates thereof are suitable for incorporation into animal feeds of any kind in application rates of from 0.1 to 2% by weight. They are suitable in particular for incorporation into mixed feeds in amounts of from 0.3 to 2, particularly preferably from 0.2 to 2, % by weight, and as additives to drinking water in application rates of from in particular 0.1 to 1.5, particularly preferably from 0.2 to 1.5, % by weight and to liquid feeds in application rates of from 0.3 to 2, in particular from 0.2 to 1.5, % by weight; in general an amount of up to 2% by weight is sufficient, although in principle it is possible to go higher. Expediently the amounts used, in each case based on the feed or the drinking water, are preferably as follows:

Mixed feeds and starting materials thereof: 0.2 to 2% by weight (cereal, cereal products, products of the starch, sugar and oil industry, vegetable and animal protein products)

Liquid feeds based on whey, skimmilk powder, brewer's yeast, molasses and/or water: 0.2 to 1.5% by weight Drinking water: 0.1 to 1.5% by weight The animal feeds according to the invention also include animal feed premixes and animal feed concentrates.

The individual components of the agent according to the invention can vary within wide limits. For instance, the agent according to the invention, if in the form of a four-component mixture, can contain for example from 10 to 50% by weight of 1,2-propanediol bisformate, from 5 to 30% by weight of 1,2-propanediol 1-formate and from 5 to 25% by weight of 1,2-propanediol 2-formate, as well as from 15 to 45% by weight of 1,2-propanediol, as long as the constituent amounts add up to a total of 100% by weight.

It is also possible to add conventional additives for animal feed and drinking water. They can be added either directly to the animal feed or drinking water, or to the agent according to the invention.

The invention is explained in more detail in the Examples below.

EXAMPLE 1

1,2-Propanediol was reacted with carbon monoxide and catalytic amounts of sodium methanolate at 250 bar and 50° C. to give a mixture of formic acid esters. Distillation gave a clear liquid composed of 31.4% by weight of 1,2-propanediol bisformate, 20.4% of 1,2-propanediol 1-formate, 16.8% of 1,2-propanediol 2-formate and 31.4% of 1,2-propanediol.

The following test result documents the antimicrobial action of the mixture according to the invention on various enterobacteriaceae:

The substances under test were added in the form of aqueous solutions to test tubes containing enterobacteriaceae, and mixed in. 24 hours later, the colonies were counted under the microscope to evaluate the extent of bacterial growth:

| Test substances | Bacterial growth 24 hours after addition of test substance | | |
|---|---|---|---|
| | E. coli | Proteus vulg | Serratia spp. |
| Control | 3 | 3 | 3 |
| Formic acid 0.1% | 0 | 0 | 0 |
| 0.3% | 0 | 0 | 0 |
| Propionic acid 0.1% | 1 | 1 | 1 |
| 0.3% | 0 | 0 | 0 |
| Mixture according to the invention 0.1% | 0 | 0 | 0 |
| 0.3% | 0 | 0 | 0 |

0 = no bacterial growth
1 = weak bacterial growth
2 = reduced bacterial growth
3 = full bacterial growth

EXAMPLE 2

92 g of glycerol, 690 g of formic acid, a catalytic amount of $H_2SO_4$ and 500 g of diisopropyl ether were refluxed for 60 h. The water of reaction was separated off a little at a time. After the esterification the solvent and the excess formic acid were distilled off, and the residue fractionated under reduced pressure. This gave 117.7 g of glycerol formate which comprised 0.8% free formic acid, 46% bisformates (mixture of 1,2- and 1,3-esters) and 53% glycerol trisformate.

The test results below document the microcidal activity on enterobacteriaceae (A=E. coli, B=Proteus, C=Serratia) analogously to Example 1. 24 hours after addition of the glycerol formate according to the invention the number of colonies in the test tubes containing the culture medium were counted as a measure of the extent of bacterial growth:

| Test sustances | Bacterial growth 24 hours after addition of test substance | | |
|---|---|---|---|
| | E. coli | Proteus vulg. | Serratia spp. |
| Control | 3 | 3 | 3 |
| Formic acid 0.1% | 0 | 0 | 0 |
| 0.3% | 0 | 0 | 0 |
| Propionic acid 0.1% | 1 | 1 | 1 |
| 0.3% | 0 | 0 | 0 |
| Glycerol formate 0.1% | 0 | 0 | 0 |
| 0.3% | 0 | 0 | 0 |

0 = no bacterial growth
1 = weak bacterial growth
2 = reduced bacterial growth
3 = full bacterial growth

We claim:

1. An animal feed or drinking water which contains a biocidally or biostatically active amount of one or more formic acid esters of 1,2-propanediol.

2. The animal feed or drinking water of claim 1 which contains not less than one of the following formic acid esters:
1,2-propanediol 1-bisformate,
1,2-propanediol 1-formate,
1,2-propanediol 2-formate.

3. The animal feed or drinking water of claim 1 which additionally contains 1,2-propanediol.

4. The animal feed or drinking water of claim 3 which contains one or more formic acid esters in a mixture with 1,2-propanediol in a total amount of from 0.1 to 2% by weight based on the total weight of the animal feed or drinking water.

5. The animal feed or drinking water of claim 1 which contains a mixture of
1,2-propanediol 1-bisformate,
1,2-propanediol 1-formate,
1,2-propanediol 2-formate and
1,2-propanediol.

6. The animal feed or drinking water of claim 1 which contains one or more formic acid esters in a total amount of from 0.1 to 2% by weight, based on the total weight of the animal feed or drinking water.

7. An animal feed or drinking water which contains a biocidally or biostatically effective amount of one or more formic acid esters of glycerol.

* * * * *